United States Patent Office

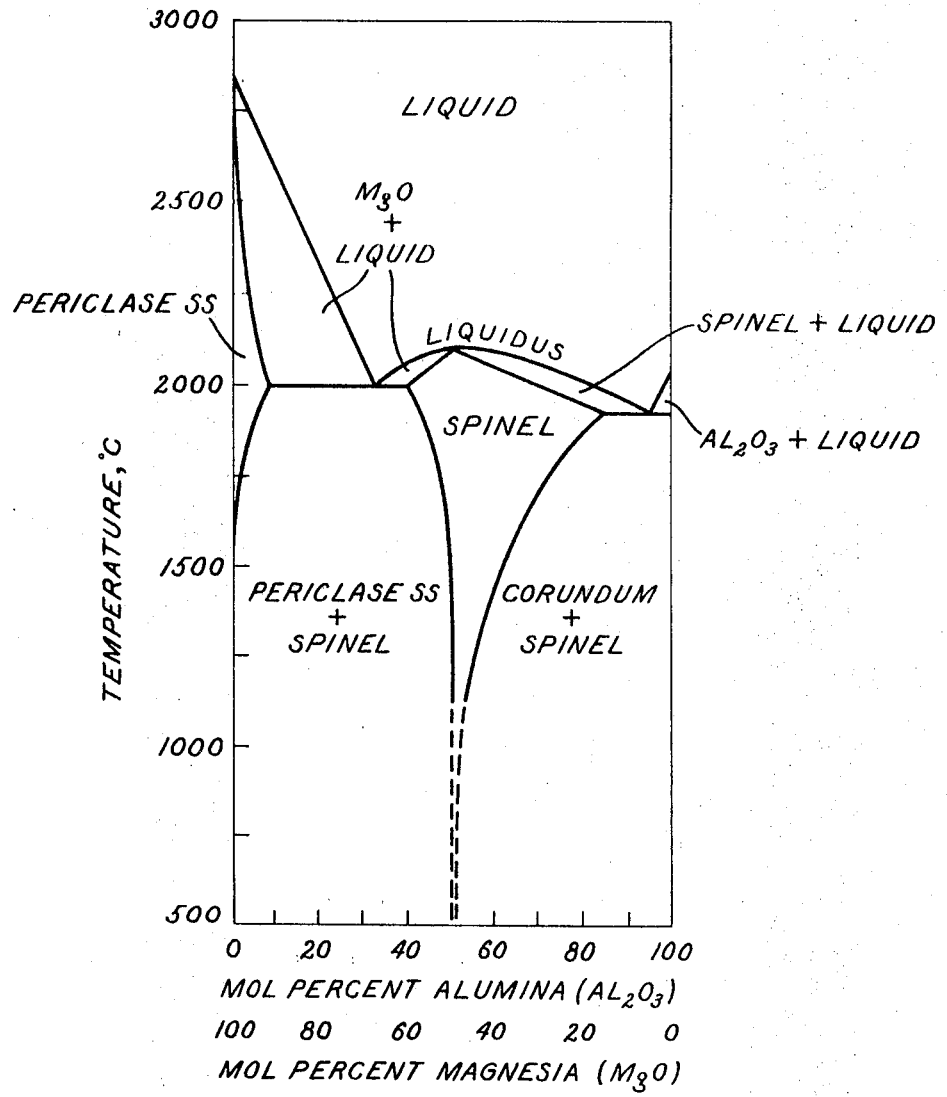

3,516,839
Patented June 23, 1970

---

3,516,839
TRANSPARENT MAGNESIA-ALUMINA SPINEL AND METHOD
Charles A. Bruch, Paoli, Pa., assignor to General Electric Company, a corporation of New York
Filed Sept. 1, 1967, Ser. No. 665,154
Int. Cl. C04b 33/00
U.S. Cl. 106—39          5 Claims

ABSTRACT OF THE DISCLOSURE

Spinel is a hard, strong material which has not heretofore been available in transparent form. Transparent spinel may be produced in a hydrogen atmosphere by a process comprising (1) melting either relatively pure spinel or a mixture of relatively pure alumina and magnesia in a proportion of 45–85 mole percent alumina; (2) holding the melt above its liquidus temperature for a period sufficiently long to permit its homogenization and degasification; and (3) allowing the melt to solidify sufficiently rapidly to prevent the formation of solid equilibrium mixtures at low temperatures.

---

Introduction

This invention relates to strong, hard transparent material and to a method for making such material.

Background of the invention

Hard, strong, transparent materials are of great interest particularly for use as observation ports or windows in military, aerospace and deep submergence oceanic vehicles. Presently various types of glasses are used but relatively thick sections are required because of the relatively low strength and hardness of glass. The weight and volume of these thick sections are usually objectionable in the types of uses indicated and for that reason harder and stronger transparent materials are desirable. Such materials have not heretofore been available.

Some materials, such as sapphire, have the necessary strength and hardness and in addition are highly transparent in monocrystalline form. Massive monocrystalline structures cannot practically be produced, however, and polycrystalline forms of these materials are generally not transparent.

In certain types of ceramic materials, namely those having isotropic crystalline structure, transparency is theoretically obtainable even in randomly oriented polycrystalline forms of these materials. Isotropic crystalline structure is evidenced by a common refractive index in a material regardless of the direction or wavelength of the incident light. Among ceramics having an isotropic crystalline structure is spinel, which is a mixed magnesium oxide-aluminum oxide refractory having the general formula $MgAl_2O_4$ and an oxygen face-centered cubic crystal structure. Spinel is well known, both in synthetic and natural form, and may include other metal atoms replacing some or all of the magnesium and aluminum atoms. Synthetic spinel offers the further advantages, for present purposes, of being hard, strong and producible from readily available precursor materials, namely alumina and magnesia. While some spinels are *partially* transparent, e.g. red spinel which does transmit limited parts of the visible spectrum, spinel and particularly polycrystalline spinel has not heretofore been available in truly transparent form. For the purposes to which the present invention is directed, transparency is required throughout the visible spectrum and a material is considered transparent only if it has this quality, that is, if it is colorless.

It is therefore an object of the present invention to provide a transparent material sufficiently hard and strong to be used for observation ports and windows in military, aerospace, and deep submergence oceanic vehicles.

Another object of this invention is to provide a hard, transparent material producible in a convenient process from readily available materials.

Still another object of this invention is to provide a process for making transparent spinel.

Brief summary of the invention

These and other objects are met in accordance with the present invention, by a process for making pure, nonporous spinel. This process, which is carried out in a hydrogen atmosphere, comprises heating relatively pure spinel or a mixture of relatively pure magnesia and alumina in a proportion of 45–85 mole percent alumina to a temperature above the liquidus temperature of the material and holding it at that temperature until a homogeneous, de-gasified melt is formed. The melt is then allowed to cool rapidly enough to prevent the formation of solid equilibrium mixtures at lower temperatures but slowly enough to prevent microcrystalline cracking. Since hardness is important in the applications to which the present invention is directed, its preferred embodiment is transparent spinel in the 70–85 mole percent composition range.

Detailed description of the invention

While the specification concludes with claims particularly pointing out and distinctly claiming the subject matter of the present invention, this invention may be better understood from the following detailed description taken in conjunction with the drawing, which is an equilibrium phase diagram of the alumina-magnesia system. The diagram indicates that when the alumina-mangesia system is at room temperature and in equilibrium, a single phase with the spinel crystalline structure occurs in a narrow composition range just above 50 mole percent. It has been found however that melt solidification, from above the liquidus temperature, of compositions in the range 45–85 mole percent alumina, generally does not result in equilibrium mixtures at lower temperatures. Instead spinel is formed with no secondary phases in evidence. This is important because secondary phase precipitates impair transparency and because the hardness of the spinel increases with increasing alumina content. The preferred form of the present invention therefore is spinel in the composition range from 70 to 85 mole percent alumina. Transparent spinel may be produced however, in accordance with the present invention, throughout the range 45–85 mole percent alumina.

Obviously, if the melt is cooled slowly enough equilibrium mixtures would form at lower temperatures. Therefore, in making transparent spinel of non-equilibrium composition, the solidification must occur quickly enough to preclude the formation of an equilibrium mixture of spinel with a non-spinel secondary phase. In one example of such a solidification process, a melt of about 125 grams of 70–80 mole percent alumina was cooled from about 2000° C. to room temperature over a period of several hours. The result was a single phase, transparent spinel.

The lack of transparency in spinel formed by prior art processes is thought to be attributable to high degrees of porosity and the presence of micro-crystalline cracks and impurities. These problems have now been avoided to a large extent by starting with relatively pure starting materials, such as relatively pure spinel or a mixture of Lucalox alumina and pure monocrystalline magnesia, and by carefully melting and solidifying the material under conditions which preclude micro-crystalline cracking, pore-formation and contamination. Generally the starting material is heated in a hydrogen atmosphere to a temperature above its liquidus temperature, maintained at that temperature to permit homogenization and outgassing or degasification and then cooled back to room temperature before being removed from the hydrogen atmosphere. If higher gas content and/or chunks rather than finely divided powder starting materials are used as starting materials, it may be necessary to hold the melt above its liquidus temperature for a longer period of time in order to achieve homogenization and degasification.

Since the melt contracts upon solidification, transparency-impairing micro-crystalline cracking occurs if the melt cools too quickly or unevenly. Therefore overly rapid cooling must be avoided. The preferred method of cooling is to gradually withdraw a crucible containing the melt over a period of several hours from the hot zone of a heated furnace. Thus the melt remains exposed to the low pressure hydrogen atmosphere while it is cooling but solidification of the melt proceeds directionally, beginning at one extremity of the crucible and moving gradually through the melt.

As an example of an experiment in which transparent spinel in the preferred composition range has been made in accordance with the present invention, 18.2 grams of pure single crystal magnesia was mixed with 107.0 grams of high quality, polycrystalline alumina, specifically Lucalox alumina, commercially available from the Lamp Glass Department of the General Electric Company. The polycrystalline alumina was in particulate form with dimensions on the order of ⅛ to ½ inch. This mixture, comprising 70 mole percent alumina, was placed in a molybdenum crucible approximately 1½ inches in diameter and 2⅝ inches high and covered with a molybdenum foil cap. The covered crucible was then placed in a vacuum furnace which was evacuated and flushed thoroughly with hydrogen several times. With a hydrogen atmosphere at absolute pressure of about 3 millimeters mercury in the furnace, the furnace and its charge were heated to about 2150° C. and held at that temperature for about 30 minutes to permit homogenization and degasification. The power to the induction heating unit in the furnace was then gradually reduced and the temperature lowered from 2150° C. to 1900° C. in about 105 minutes. Thereafter the power was cut off completely and the furnace and charge were allowed to cool over night. The resulting spinel ingot, withdrawn the next day, was sound but slightly discolored. This was thought to be due to some slight surface contamination possibly involving a reaction with the molybdenum crucible and impurities in the hydrogen atmosphere. After removing the ingot from the molybdenum crucible, a one-half inch thick piece was polished on two opposing faces and was found to be perfectly clear and transparent. The crystal structure of the ingot was then examined by X-ray diffraction techniques and a single phase, having the spinel crystalline structure, was found. No secondary phase was discernible. The composition of the ingot however had changed from 70 mole percent alumina to approximately 78 mole percent alumina at the top of the ingot and 75.5 mole percent alumina at the bottom of the ingot. The decrease in magnesium oxide in the overall mixture is thought to be due to evaporation of magnesia in the furnace.

Modifications of this process include the use of flowing hydrogen at about atmospheric pressure rather than a static hydrogen atmosphere at low pressure and directional solidification of the melt by lowering the crucible from the hot zone to prevent uneven contraction and cracking. A further alternative is to cast a homogenized degasified melt into some preselected form to produce a particular shape of transparent spinel product.

What I claim as new and desire to secure by Letters Patent of the United States is:

1. A hard optically transparent colorless substantially homogeneous solid material consisting essentially of 45–85 mole percent alumina, remainder magnesia, in a spinel crystalline structure.

2. A material as claimed in claim 1, wherein the alumina content is 70–85 mole percent.

3. A method for producing optically transparent colorless substantially homogeneous spinel comprising
   (a) forming a melt consisting essentially of 45–85 mole percent alumina and remainder magnesia by heating the mixed constituents thereof in a hydrogen atmosphere to above the liquidus temperature of the said composition and maintaining the mixture at that temperature until melting is complete, gas evolution from it ceases, and any bubbles initially present in the melt pass off from it;
   (b) cooling the melt in the hydrogen atmosphere to room temperature during a period of several hours.

4. A process as claimed in claim 3, wherein said constituents are initially provided as pure polycrystalline alumina and pure crystal magnesia.

5. A process, such as that recited in claim 3, wherein said material, comprising a charge of 125 grams of alumina-magnesia, is heated in a molybdenum crucible to about 2150° C. and said cooling of said material comprises gradually lowering the temperature to 1950° C. and then allowing it to cool to room temperature over a period of several hours.

References Cited
UNITED STATES PATENTS

| | | | |
|---|---|---|---|
| 1,952,256 | 3/1934 | Jaeger et al. | 106–42 |
| 3,079,240 | 2/1963 | Remeika | 106—42 X |
| 3,083,123 | 3/1963 | Navias | 106—42 X |
| 3,304,153 | 2/1967 | Bakker et al. | 23—52 |

FOREIGN PATENTS 1,119,461  6/1956  France.

HELEN M. McCARTHY, Primary Examiner

W. R. SATTERFIELD, Assistant Examiner

U.S. Cl. X.R.

23—52, 67; 65—137; 106—42, 62